United States Patent [19]
Furomoto

[11] Patent Number: 5,332,175
[45] Date of Patent: Jul. 26, 1994

[54] SPINNING REEL HAVING ROTATIONAL BALANCE MECHANISM FOR ROTOR

[75] Inventor: Yoshiyuki Furomoto, Osaka, Japan

[73] Assignee: Shimano Inc., Osaka, Japan

[21] Appl. No.: 921,062

[22] Filed: Jul. 29, 1992

[30] Foreign Application Priority Data

Aug. 6, 1991 [JP] Japan .................. 3-195670

[51] Int. Cl.5 .............................................. A01K 89/01
[52] U.S. Cl. .................................................... 242/231
[58] Field of Search ............... 242/230, 231, 232, 233, 242/245

[56] References Cited

U.S. PATENT DOCUMENTS

| | | | |
|---|---|---|---|
| 2,942,798 | 6/1960 | Alinari | 242/232 |
| 3,586,255 | 6/1971 | Monthulet | 242/232 |
| 3,987,976 | 10/1976 | Lilland | 242/232 |
| 4,171,108 | 10/1979 | Ishida et al. | |
| 4,222,534 | 9/1980 | Ishida | 242/322 |
| 4,702,431 | 10/1987 | Kaneko | 242/245 |

FOREIGN PATENT DOCUMENTS

| | | | |
|---|---|---|---|
| 897418 | 3/1945 | France | 242/232 |
| 52-80887 | 6/1977 | Japan . | |
| 6280570 | 5/1985 | Japan . | |

Primary Examiner—Katherine Matecki
Attorney, Agent, or Firm—Dickstein, Shapiro & Morin

[57] ABSTRACT

A rotationally balanced spinning reel has a rotor rotatable about an axis, a line guide portion formed on an arm lever of one of a pair of arm portions formed on the rotor, and a bail extending between the line guide portion and the other arm portion with the bail being switchable between a releasing position and a retrieving position through pivotal movement about a pivot axis. The pivot axis is set relative to a plane extending normal to the rotational axis with a side of the arm lever being displaced with an inclination to a side of the reel body.

4 Claims, 4 Drawing Sheets

SPINNING REEL HAVING ROTATIONAL BALANCE MECHANISM FOR ROTOR

BACKGROUND OF THE INVENTION

1. Field of the Invention

The present invention relates to a spinning reel having a balancing mechanism, and more particularly to a spinning reel having a reel body, a rotor attached to a forward position of the reel body to be rotated about an axis by a force from a handle, a line guide portion formed on an arm lever of one of a pair of arm portions formed on the rotor, and a bail extending between the line guide portion and the other arm portion or between the line guide portion and a pivotable arm provided to said other arm portion, the bail being switchable between a releasing position and retrieving position through pivotal movements of said arm cam and said bail about a pivot axis. The invention specifically relates to an art for improving a rotational balance of the rotor.

2. Description of the Related Art

In general, with the above-described construction, the spinning reel functions to retrieve a fishing line about a spool with the fishing line being guided to the line guide portion through the bail.

Also, in the case of the conventional spinning reels, there tends to occur an imbalance in the weights of the arm lever constructed as a relatively heavy part, the line guide portion of the arm lever (normally, the portion is constructed of a rotary member commonly referred to as a line roller or the like) and so on about the axis. Accordingly, in order to improve the rotational balance, the weights of such components as mentioned above are so positioned relative to each other as to offset said weights against each other in a direction along the axis and a balancer is disposed inside the rotor (for example, the Japanese laid-open utility model No. 52-80887).

Now, considering the conventional art described in the above-identified reference, in this conventional art, although the construction is so designed as to achieve the weight balance in the direction along the rotational axis of the rotor, a gravity center of the rotor is located at a relatively forward position of the rotor due to the weight of the arm lever as described above. Then, even with such arrangement of the balancer, there remains a significant distance between the gravity center of the rotor and the gravity center of the balancer in the direction normal to the rotational axis of the rotor. As a result, if a line retrieving operation is effected under such condition, there is generated a torque.

Accordingly, in the case of the reel having such balance construction as described above, when the line retrieving operation is effected at a high speed, there occurs a significant vibration in the rotor which vibrates in turn a top portion of the fishing rod, so that the line retrieving operation can not be effected in a smooth manner.

In recent years especially, in many cases, for the purpose of reducing a load during a line retrieving operation, the line roller is provided with a large diameter or the arm lever is provided with a mechanism for allowing a one-step release operation of the bail, so that the gravity center of the components including the arm lever is displaced on the side of the arm lever at a forward position of the rotor. In such constructions, the produced torque has a large value, so that a smooth line retrieving operation will be even more difficult. In this respect, there remains room for improvement.

Then, it is conceivable to obtain the gravity center of the rotor and to dispose a single balancer at a position opposed to said gravity center across the rotational axis of the rotor. However, in most rotors of the conventional types, as described herein, the gravity center tends to appear at a relatively forward position of the rotor and also where no components constituting the rotor are present. In case the center of gravity appears at such location, it has been difficult to arrange the balancer.

The object of the present invention is to provide a spinning reel with an effective construction which allows good balance in the rotation of the rotor without necessitating complicated construction and which therefore allows a smooth line retrieving operation even at a high speed.

SUMMARY OF THE INVENTION

For accomplishing the above-noted object, according to the present invention, in a spinning reel of the afore-described type having a rotor rotatable about an axis, a line guide portion formed on an arm lever of one of a pair of arm portions formed on the rotor, and a bail extending between the line guide portion and the other arm portion with the bail being switchable between a releasing position and a retrieving position through pivotal movements about a pivot axis, the pivot axis is set relative to a plane extending normal to the rotational axis with a side of the arm cam being displaced with an inclination to a side of said reel body.

Functions and effects of the above construction will be described next.

If the above-described construction is embodied as shown in FIGS. 1 and 2 for example, in comparison with the conventional reels, since the arm lever 8 is disposed closer to the reel body 2 (i.e. the pivotable arm 9 is disposed away from the reel body), the gravity centers of such components disposed in opposition to this arm cam 8, as the arm portion 4A, the pivotable arm 9 and so on, can be set in opposition to each other so that the weights of the respective gravity centers may offset each other. Moreover, like the conventional construction, the construction allows the pivotable operation of the bail 3 about the single axis (i.e. pivot axis Y).

That is to say, according to the present invention, as the arm lever 8 constructed as a heavy component is displaced towards the reel body, or as the pivotable arm 9 is displaced in a direction away from the reel body, it is possible to obtain a dynamic balance of the rotor 4 without providing a heavy balancer (the present invention does not inhibit attachment of a balancer having a relatively small weight).

Accordingly, the present invention has provided an improved spinning reel which allows a smooth line retrieving operation even at a high speed through balancing of the rotor rotation without causing any inconvenience in the operation of the bail or without using a heavy balancer.

Especially, the present invention has achieved a further advantage of not requiring weight increase in the entire reel since no heavy balancer is necessary.

Further, and other objects, features and effects of the invention will become more apparent from the following more detailed description of the embodiments of the invention with reference to the accompanying drawings.

DESCRIPTION OF THE PREFERRED EMBODIMENTS

Preferred embodiments of the present invention will now be described with reference to the accompanying drawings.

Figure 4:
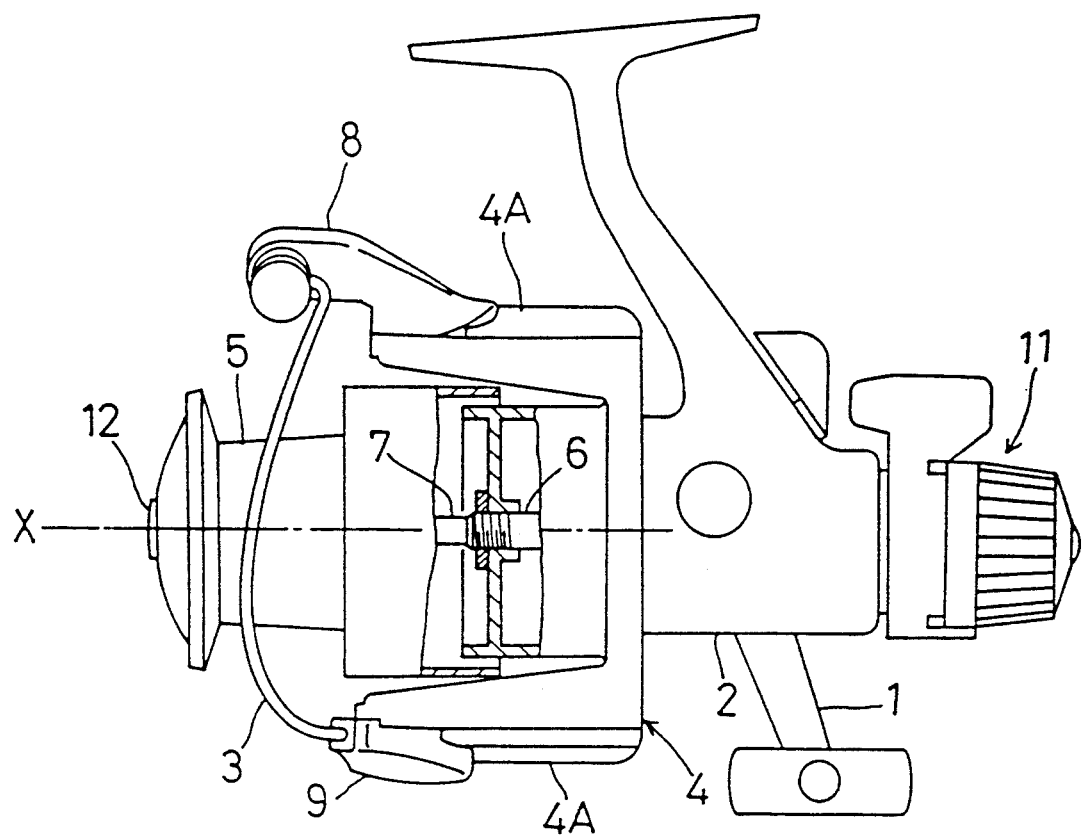
FIG. 4 is an overall side view of a spinning reel.

As shown in FIG. 4, a spinning reel includes a reel body 2 having a handle 1. At forward positions of the reel body 2, there are disposed a rotor 4 having a bail 3 and a spool 5 for retrieving a fishing line (not shown). At other forward positions of the reel body 2, there are also disposed a cylindrical shaft 6 for transmitting a force from the handle 1 to the rotor 4 and a spool shaft 7 which supports a spool 5.

As shown in FIGS. 1 through 4, the rotor 4 includes a pair of arm portions 4A, 4A at positions opposed to each other across a rotational axis X. Between an arm lever 8 attached to the one arm portion 4A and a pivotable arm 9 attached to the other arm portion 4A, a bail 3 is attached. And, the bail 3 is rendered switchable between a releasing position and a retrieving position through pivotal motions of the arm lever 8 and the pivotable arm 9 about a pivot axis Y.

Figure 1:
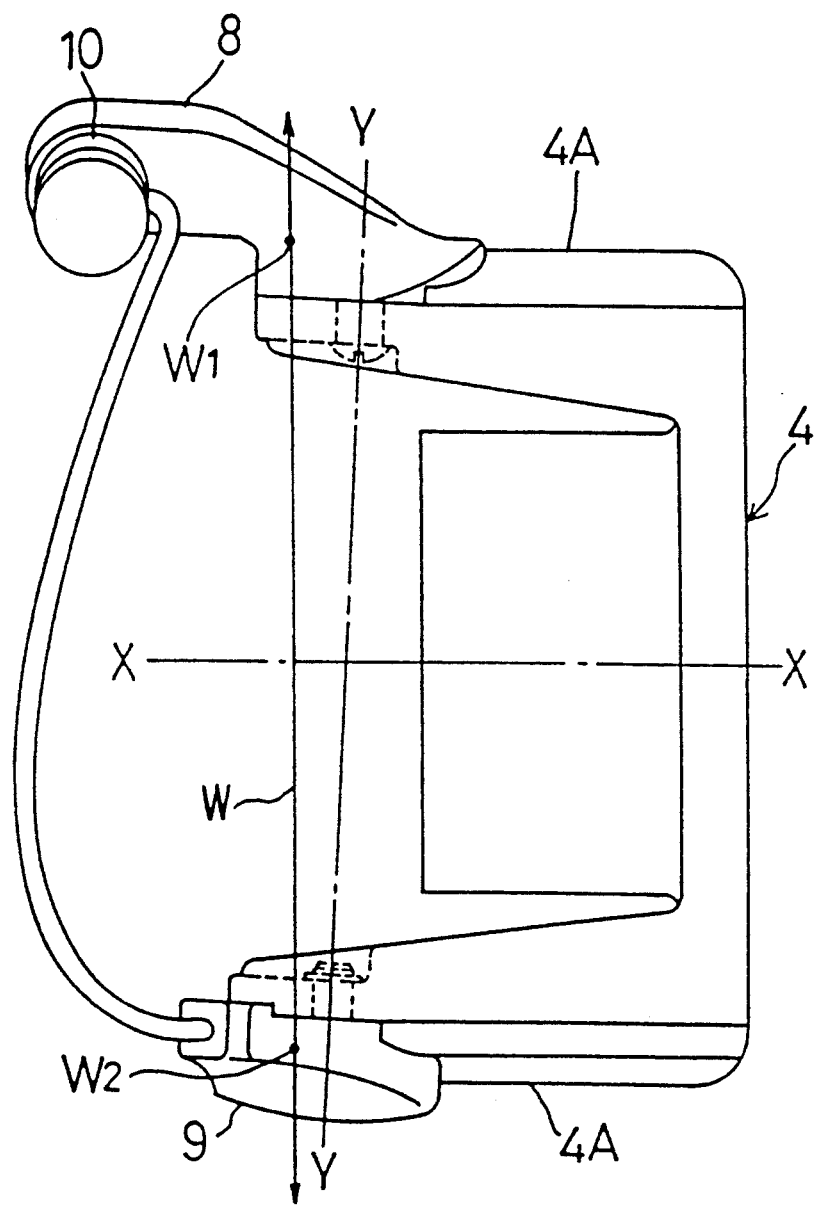
FIG. 1 is a a side view of a rotor.

The arm lever 8 includes a line roller 10 acting as a line guide unit for guiding the fishing line. In this reel, in order to offset the balance of the weights of the arm lever 8, the pivotable arm 9, the line roller 10 and so on, the pivotable arm 9 is formed of a heavy material such as metal; and also, with reference to a plane extending normal to the rotational axis X, the pivot axis Y is displaced with 5 an inclination so that a side of the arm lever 8 is displaced towards the reel body 2 whereby a gravity center W1 of this arm lever 8 and a gravity center W2 of the pivotable arm 9 are opposed to each other across the rotational axis X. In the present invention, positioning of the gravity centers W1 and W2 opposed to each other with reference to the rotational axis X is for the purpose of improving the rotational balance of the rotor. In the preferred embodiment, as seen in FIG. 1, a line W connecting the gravity centers W1 and W2 is normal to the rotational axis X when the bail is in its line retrieving position.

Figure 2:
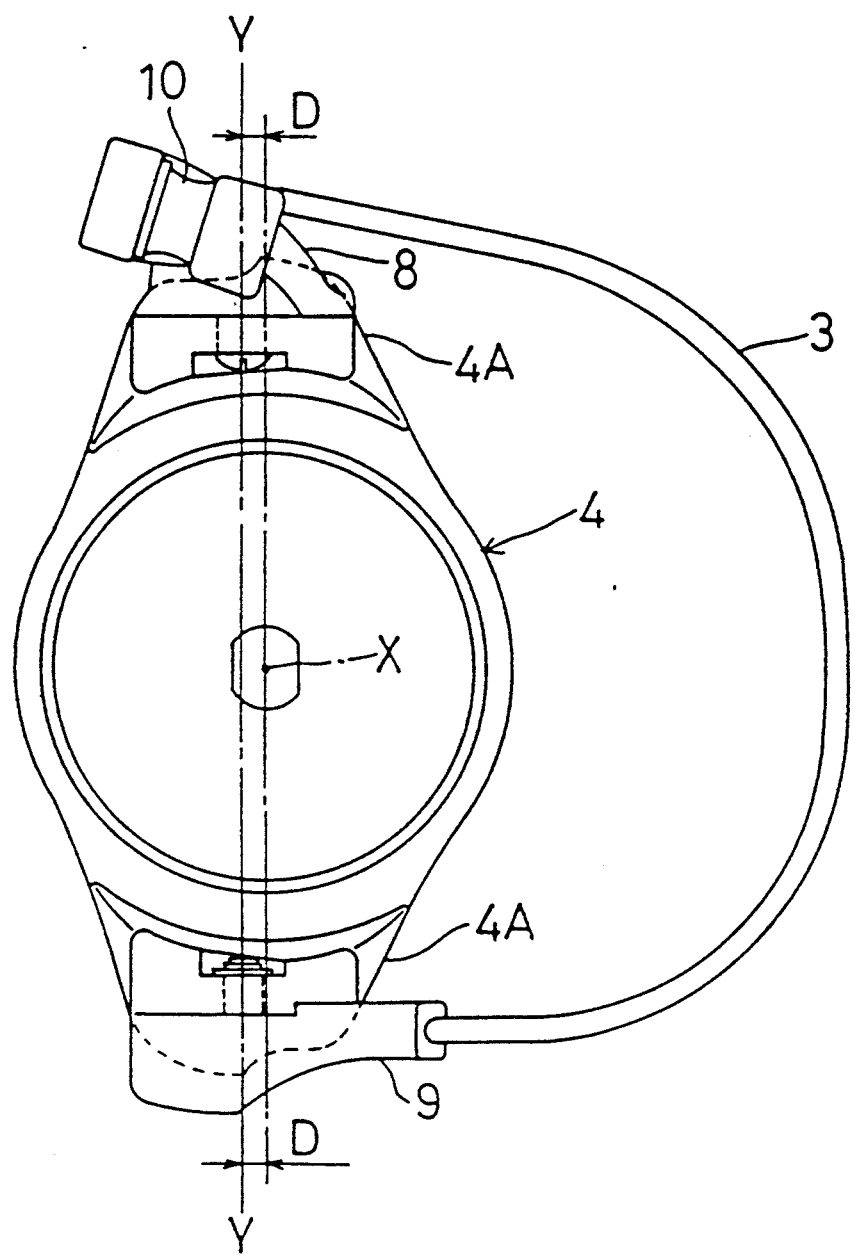
FIG. 2 is a front view of the rotor.
Figure 3:
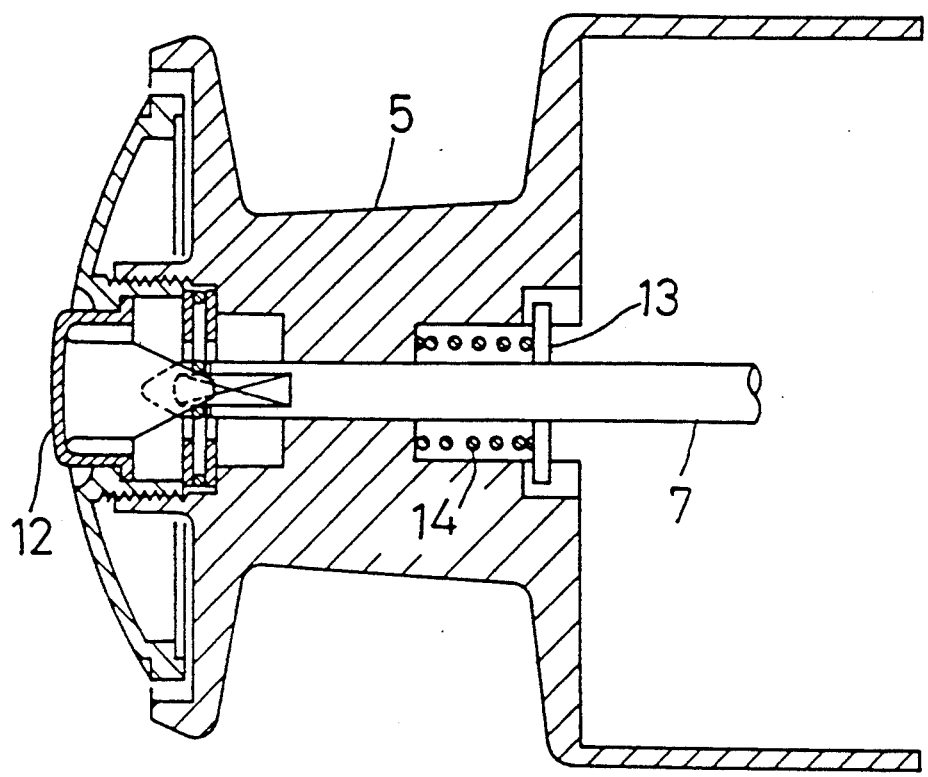
FIG. 3 is a side view in vertical section of a spool.

Incidentally, in this reel, in order to restrict imbalance due to the weight of the bail 3 by means of the weights of the pair of the arm portions 4A, 4A, the arm lever 8 and of the pivotable arm 9, as illustrated in FIG. 2, with respect to the rotational axis X, the pair of arm portions 4A, 4A are displaced to the opposite side to the bail by an amount D.

Further, in this reel, a drag mechanism 11 is provided at a rear position of the reel body 2. At a forward end portion of the spool 5, there is provided a push button 12 for dismounting the spool 5 from the spool shaft 7; and between the spool shaft 7 and the spool 5, there are interposed a pin 13 for preventing relative rotation therebetween and a spring 14 for absorbing looseness in the spool 5.

In addition to the above-described embodiment, it is also conceivable to dispose a balancer at the forward face of the rotor in order to restrict the imbalance due to the weight of the bail 3. Further alternately, the present invention can be embodied in a reel which does not have the pivotable arm.

Moreover, the present invention can be embodied also in such a construction as disclosed in the Japanese laid-open utility model gazette No. 62-80570 where the reel is provided with a lever-type control member for operating the arm cam to the position for releasing the bail. With the provision of such control member, the invention can achieve improvement in the rotational balance also in the construction where the gravity center of the rotor is displaced towards the forward side of the rotor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:
   a reel body;
   a rotor attached to said reel body forwardly of said reel body, said rotor being rotatable about an axis;
   a first arm portion and a second arm portion fixed to said rotor;
   an arm lever mounted on said first arm portion to be pivotable about a first pivot axis;
   a pivotable arm mounted on said second arm portion to be pivoted about a second pivot axis;
   a bail fixed between said arm lever and said pivotable arm, said bail being pivotable with said arm lever and said pivotable arm between a line retrieving position and a line releasing position;
   wherein said first pivot axis and said second pivot axis are on a pivot line which is sufficiently inclined from a plane normal to said axis of said rotor to balance said rotor during rotation, with a line connecting the center of gravity of said arm lever and the center of gravity of said pivotal arm being substantially normal to said axis of said rotor when the bail is in the line retrieving position.

2. A spinning reel of claim 1 wherein said first pivot axis and said second pivot axis are aligned with each other.

3. A spinning reel of claim 1 wherein said first pivot axis is positioned more rearwardly than said second pivot axis with respect to said reel body.

4. A spinning reel of claim 1 wherein said first pivot axis and said second pivot axis are offset with respect to said rotational axis of said rotor by a distance (D) required to substantially balance said rotor when said bail is in said line retrieving position.

* * * * *